Oct. 23, 1969     M. H. MAURER ET AL     3,475,120

PRODUCTION OF SULFURIC ACID

Filed March 28, 1967     2 Sheets-Sheet 1

MICHAEL H. MAURER
CURT S. BENEFIELD
INVENTORS

BY J. T. Chaloty
AGENT

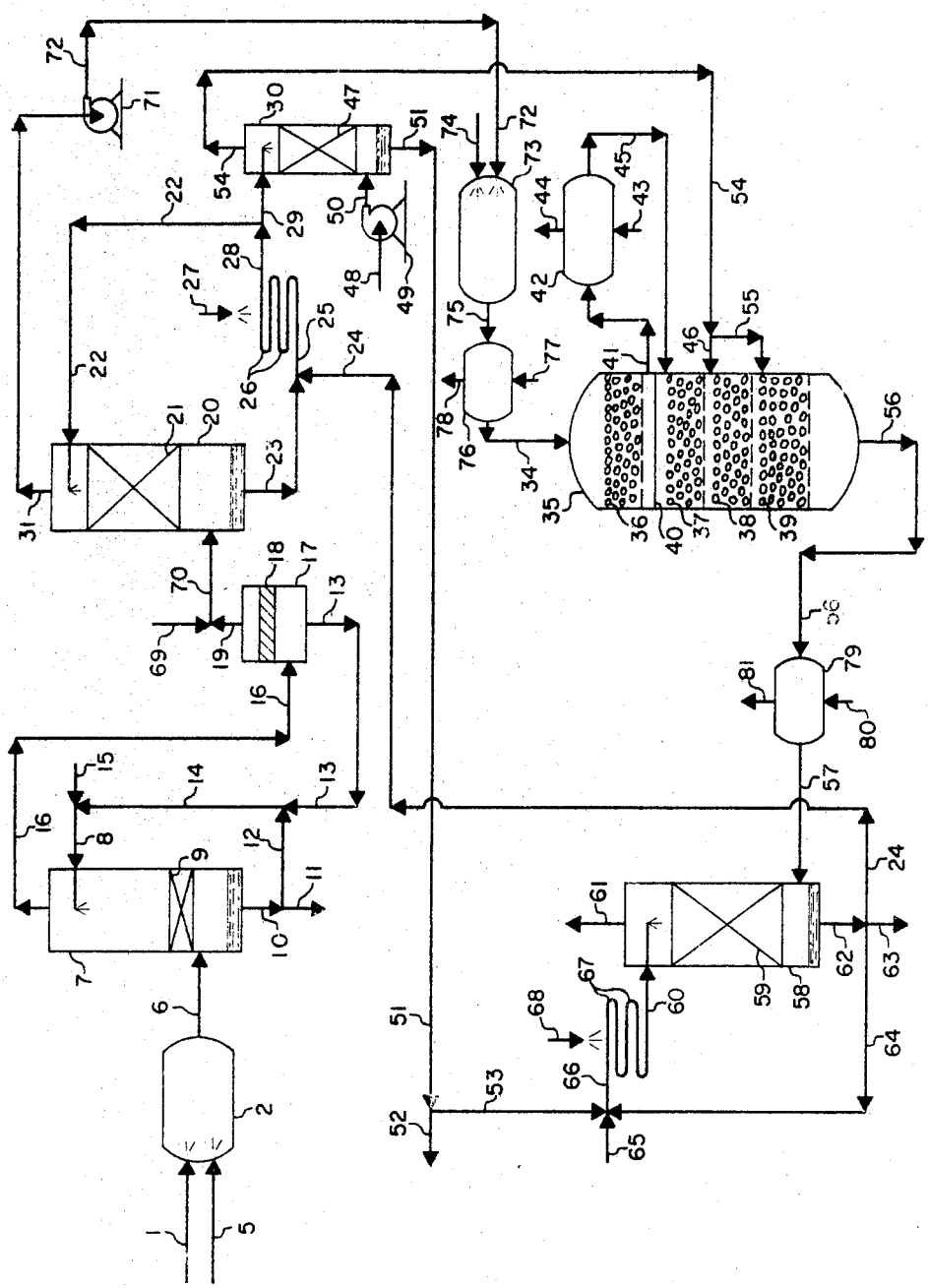

United States Patent Office 3,475,120
Patented Oct. 28, 1969

3,475,120
PRODUCTION OF SULFURIC ACID
Michael H. Maurer, New York, N.Y., and Curt S. Benefield, Scotch Plains, N.J., assignors to Chemical Construction Corporation, New York, N.Y., a corporation of Delaware
Filed Mar. 28, 1967, Ser. No. 626,489
Int. Cl. C01b 17/74
U.S. Cl. 23—168                                                17 Claims

ABSTRACT OF THE DISCLOSURE

Concentrated sulfuric acid is employed to scrub a gaseous sulfur dioxide-containing feed stream prior to catalytic sulfur trioxide formation in a sulfuric acid process, in order to remove water vapor from the feed stream. The liquid sulfuric acid also absorbs some sulfur dioxide, which is removed from the acid by stripping with air, which is concomitantly dried, to form a dry process gas stream containing sulfur dioxide. The resultant process gas stream containing oxygen and sulfur dioxide, and free of water vapor, is added to the main process gas stream between stages of catalytic conversion of sulfur dioxide to sulfur trioxide, to provide a quench-cooling effect and also to recover the sulfur dioxide content of the process gas stream by conversion to sulfur trioxide, with subsequent absorption of sulfur trioxide from the total process gas stream into concentrated sulfuric acid to form further sulfuric acid.

BACKGROUND OF THE INVENTION

Field of the invention

Figure 1:
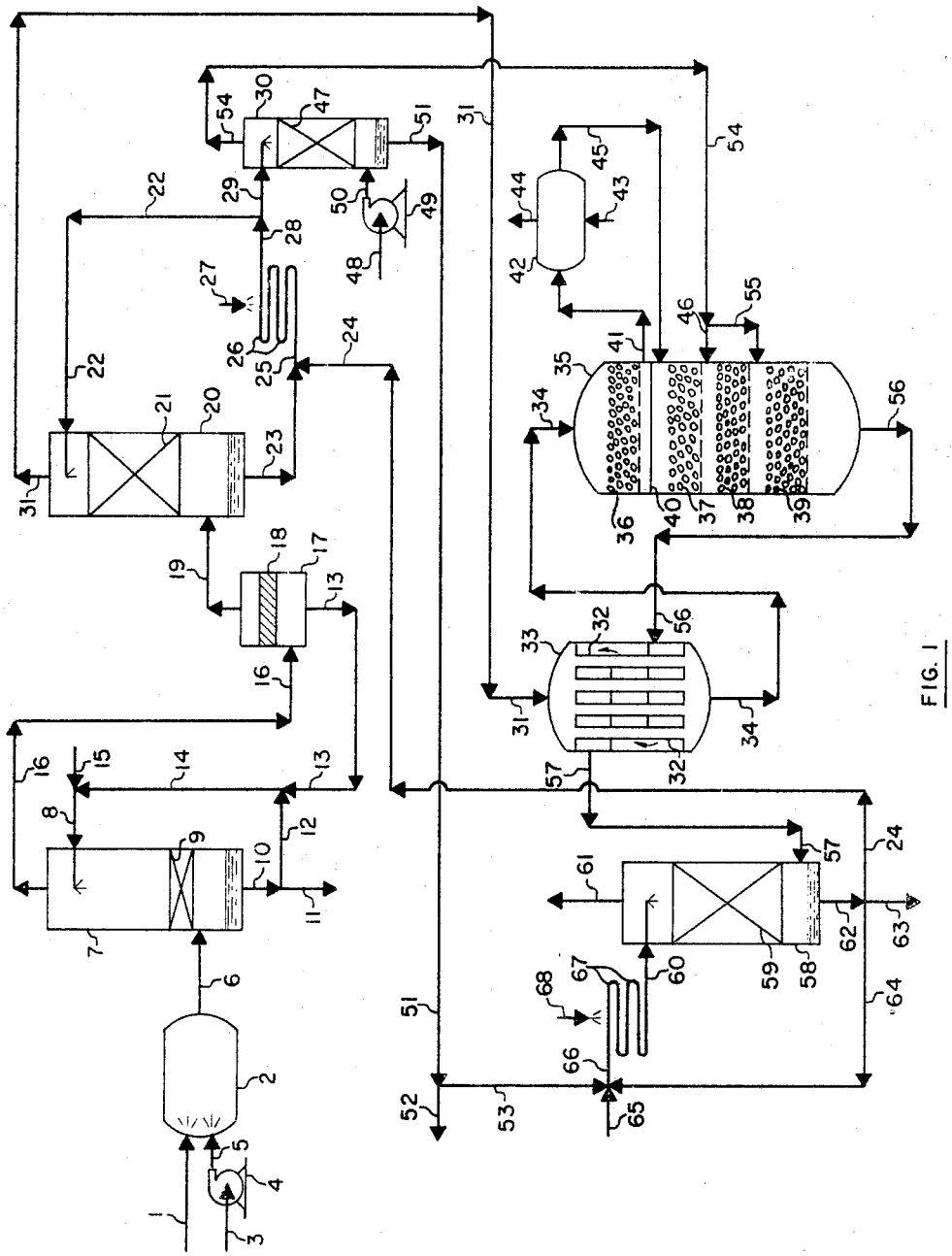

The invention pertains to the production of sulfuric acid from a gaseous sulfur dioxide feed stream containing water vapor. The feed gas stream is scrubbed with concentrated sulfuric acid to remove water vapor, and is then passed to multi-stage catalytic conversion with interstage cooling, to catalytically oxidize sulfur dioxide to sulfur trioxide. The resultant converted gas stream is then scrubbed with concentrated sulfuric acid of at least 98% acid strength, to absorb sulfur trioxide with in situ formation of further sulfuric acid.

Description of the prior art

The practice of scrubbing the sulfur dioxide-containing process gas stream in a sulfuric acid process with concentrated sulfuric acid to remove water vapor, prior to catalytic oxidation of the sulfur dioxide to sulfur trioxide, is shown in U.S. Patents Nos. 940,595; 2,019,893; 2,028,733; 2,038,429 and 2,174,739. In addition, a description of sludge acid regeneration to sulfuric acid, in which this procedure is employed, is contained in The Oil and Gas Journal issue of Jan. 18, 1954, pages 101–104. The stripping of water or acid solutions with air to remove dissolved sulfur dioxide is included in the disclosures of U.S. Patents Nos. 2,091,937; 2,111,389; 2,341,887 and 2,789,035, and British Patent No. 422,880. The concepts of the injection of air per se between catalyst stages in a multi-stage sulfur dioxide oxidation process is described in British Patents Nos. 621,158 and 916,276.

SUMMARY OF THE INVENTION

The present invention relates to the production of sulfuric acid, by the burning of a sulfur-containing feed stream such as sludge acid with air, which results in the formation of a process gas stream containing sulfur dioxide and water vapor, which is scrubbed with concentrated sulfuric acid to remove water vapor from the gas stream, prior to catalytic conversion of sulfur dioxide to sulfur trioxide in a multi-stage catalytic converter. It has been determined that substantial process advantages are derived from the process sequence of the invention relating to the processing of all or a portion of the concentrated sulfuric acid, to remove the proportion of sulfur dioxide which is absorbed during the gas scrubbing step. A portion or all of the concentrated acid is usually withdrawn after scrubbing, and passed to product utilization or blending with the concentrated 98% acid employed for sulfur trioxide absorption. In such instances, the absorbed proportion of sufur dioxide in the withdrawn acid portion is essentially wasted, and is usually discharged to the atmosphere in the tail gas from the process. In addition to process loss of sulfur values, a highly objectionable air pollution problem occurs due to pollution of the atmosphere with sulfur dioxide. In most communities, stringent regulations exist with regard to sulfur dioxide emission from chemical plants.

In the present invention, the concentrated acid portion withdrawn from the gas scrubbing and drying step, and containing dissolved sulfur dioxide values, is contacted with a stream of air in a stripping operation, which removes the sulfur dioxide from the acid into the air stream and concomitantly dries the air stream by absorption of water vapor into the acid. A dry process gas stream containing sulfur dioxide is thus formed. The resultant dried process gas stream containing sulfur dioxide is passed to the multi-stage catalytic converter, in which the sulfur dioxide content of the main gaseous process stream is catalytically oxidized to sulfur trioxide, and the dried process gas stream is usefully employed as an interstage or interbed quench medium by being directly injected into the main process gas stream between stages or beds. The main gas stream is thus cooled to the optimum temperature for further catalytic conversion, and in addition the sulfur dioxide content of the dried process gas stream is usefully recovered by conversion to sulfur trioxide which is subsequently recovered as sulfuric acid.

The process of the present invention provides several important advantages. The wasteful and objectionable discharge of sulfur dioxide to the atmosphere is prevented, and consequently an air pollution problem is eliminated. As mentioned supra, in the prior art the sulfur dioxide-containing acid is blended with the 98% acid passed either to the sulfur trioxide absorption tower or to product utilization. When the 98% tower acid contains sulfur dioxide, the sulfur dioxide dissolved in the tower acid is stripped during sulfur trioxide absorption and is discharged to the atmosphere in the process tail gas. When the product acid contains sulfur dioxide, this sulfur dioxide content constitutes a process loss and may be objectionable for sulfuric acid usages.

Another advantage of the present invention is that a more complete conversion and recovery of sulfur dioxide as valuable sulfuric acid is attained. A further advantage is that the total gas compression requirement of the process is reduced, since the stripping air may be utilized at a lower pressure than the main stream of process air, because the resultant dried process gas stream containing sulfur dioxide is employed as a quench medium in downstream stages of the process and after substantial pressure drop of the main process gas stream has occurred. Although an extra air blower or compressor is required, less process gas is compressed to high pressure, and consequently greater overall capacity can be obtained in the sulfuric acid plant. Another advantage is that a quench medium is provided for interstage cooling during multi-stage catalytic conversion of sulfur dioxide to sulfur trioxide, and consequently the prior art requirement of expensive cooling coils for interstage cooling is eliminated. Finally, the procedure of the present invention is applicable to any sulfuric acid process in which a sulfur dioxide-containing process gas stream, which also contains water vapor, is scrubbed with concentrated sulfuric acid to remove water vapor, as a result of which the concentrated acid absorbs sulfur dioxide. The invention is thus particularly applicable to sulfuric acid processes in which a sulfur dioxide-containing feed stream is produced from sulfur-containing materials such as pyrites or sludge acid derived from petroleum refining.

It is an object of the present invention to provide an improved process for the production of sulfuric acid.

Another object is to provide an improved procedure for processing the concentrated sulfuric acid employed to scrub, and thereby to dry, a process gas stream containing sulfur dioxide and water vapor to be employed in sulfuric acid manufacture.

An additional object is to provide a quench medium consisting of dry process gas containing sulfur dioxide and produced by stripping sulfur dioxide from concentrated sulfuric acid with air, for interstage cooling of the main process gas stream between stages of catalytic oxidation of sulfur dioxide to sulfur trioxide, in a sulfuric acid process.

A further object is to provide improved and more complete recovery of sulfur dioxide in a sulfuric acid process, by conversion of the sulfur dioxide to sulfuric acid.

Still another object is to reduce air pollution due to sulfur dioxide emission in a sulfuric acid process.

These and other objects and advantages of the present invention will become evident from the description which follows.

DESCRIPTION OF THE DRAWINGS AND PREFERRED EMBODIMENTS

Referring to the drawings, which consist of flowsheets illustrating preferred embodiments of the invention, FIGURE 1 is a flowsheet of an embodiment of the invention in which a sulfur-containing feed stream such as pyrites, sludge acid or hydrogen sulfide provides the entire source of sulfur for the process, and FIGURE 2 is a flowsheet of an alternative combination and embodiment of the invention, in which a sulfur-containing feed stream such as those mentioned supra is burned with air to provide an intermediate process gas stream containing a low content of sulfur dioxide together with excess free oxygen, and the intermediate process gas stream is employed to support combustion of elemental sulfur so as to produce a process gas stream of sufficient sulfur dioxide content for utilization in sulfuric acid manufacture.

Referring now to FIGURE 1, a sulfur-containing feed stream 1 is passed into combustion furnace 2. Stream 1 may consist of any suitable sulfur-containing material, such as sludge acid, pyrites, other types of sulfide ores, or hydrogen sulfide. Combustion and oxidation air stream 3 is passed via blower 4 and stream 5 into furnace 2 at a relatively elevated pressure, in order to provide the requisite pressure driving force for circulating the main process gas stream through the apparatus units of the process sequence. A combustion reaction takes place at elevated temperature between streams 1 and 5 in furnace 2, resulting in the generation of a high temperature process gas stream 6 containing sulfur dioxide and excess free oxygen, as well as nitrogen and water vapor. Stream 6 will usually also contain entrained solid particles, derived from stream 1, and stream 6 will also contain carbon dioxide in instances when stream 1 contains carbonaceous material, such as sludge acid derived from petroleum refining. In most instances when sludge acid from petroleum refining is utilized as stream 1, the blended sludge acid feed will contain from 70% to 92% sulfuric acid, 5% to 21% water and 6% to 20% hydrocarbons. In cases where pyrites is employed as the sulfur-containing feed stream 1, unit 2 will consist of a conventional type of pyrites burner such as a tray or fluid bed unit, and will be provided with ancillary means for removal of solid pyrites cinder.

Stream 6 is produced at a highly elevated temperature, which is dependent upon the particular composition of stream 1, since optimum temperature conditions in unit 2 will depend upon the nature and combustion characteristics of stream 1. In most instances stream 6 will be produced at a temperature in the range of 200° C. to 800° C., and consequently stream 6 will usually be initially cooled on discharge from unit 2, by passing stream 6 through auxiliary waste heat recovery facilities such as a steam boiler, not shown. In any case, process gas stream 6 usually next passes into scrubbing tower 7, in which the gas stream is scrubbed with an aqueous solution usually consisting of water, to remove entrained solid particles and also for gas cooling purposes. Aqueous liquid stream 8 is sprayed or otherwise dispersed into the upper part of unit 7, and flows downwards countercurrent to the rising gas phase. A gas-liquid contact section 9 will usually be provided within unit 7, to promote gas-liquid contact. Section 9 may consist of packing, grids, sieve trays or other suitable apparatus for promoting gas-liquid contact. The resulting warmed liquid containing entrained solid particles is removed from the bottom of unit 7 via stream 10, and a portion of stream 10 or settled solid material is discharged via stream 11 to waste disposal. The balance of stream 10 consisting of stream 12 is combined with liquid stream 13 derived in a manner to be described infra. The combined stream 14 is recycled to unit 7 via stream 8, together with makeup aqueous liquid or water stream 15.

The cooled and scrubbed process gas stream 16 discharged from the upper section of unit 7 is now substantially free of entrained solid particles and is essentially saturated with water vapor, however stream 16 will usually also contain an entrained mist of aqueous and generally acidic liquid particles which usually must be removed prior to further processing, in order to maintain a proper water balance in the sulfuric acid system. Stream 16 is passed into mist eliminator 17, which is provided with filter pad or mesh 18. The gas stream flows upwards through unit 17 and liquid droplets impinge on pad 18, with the resultant removal of entrained droplets from the gas stream. Collected water or aqueous acidic solution is removed from the bottom of unit 17 via stream 13. Alternatively, stream 16 may be passed through an electrostatic precipitator to remove entrained droplets and mist.

The process gas stream 19 discharged from unit 17 is now free of entrained liquid droplets, and contains sulfur dioxide, excess free oxygen, water vapor and inerts such as nitrogen. An additional stream of air, not shown, may be added to stream 19 to provide additional free oxygen in the process gas stream, in instances when required for complete subsequent oxidation of sulfur dioxide to sulfur trioxide. In any case, stream 19 must be processed to remove water vapor, prior to catalytic oxidation of sulfur dioxide to sulfur trioxide, since if water vapor is present in the process gas stream at this stage of the process, a liquid sulfuric acid mist or fog will subsequently form in the gas stream. This mist is highly objectionable since it causes corrosion of process equipment, and in addition the mist is very difficult to remove from the gas stream and is discharged to the atmosphere in the tail gas from the process, which results in a serious air pollution problem. In order to remove water vapor from process gas stream 19, the process gas is scrubbed with concentrated sulfuric acid of a strength typically in the range of 90% to 100% sulfuric acid content by weight, which acts as a dehydrating agent and readily absorbs all of the water vapor from the process gas stream. In addition, a minor proportion of sulfur dioxide is absorbed into the liquid sulfuric acid during the scrubbing of the process gas stream.

Stream 19 is passed into the lower portion of drying tower 20, and flows upwards through gas-liquid contact section 21 and countercurrent to downflowing concentrated liquid sulfuric acid stream 22, which is sprayed or otherwise dispersed into unit 20 above section 21. As mentioned supra, stream 22 will typically have a sulfuric acid content in the range of 90% to 100% by weight. Section 21 consists of any suitable gas-liquid contact means or apparatus, such as a bed of packing consisting of spheres, rings or saddles, or other contact means such as bubble cap plates or sieve trays. The resulting diluted sulfuric acid containing absorbed water vapor and some dissolved sulfur dioxide is collected at the bottom of unit 20 and removed via stream 23. Makeup concentrated sulfuric acid stream 24, derived from within the process as will appear infra and having a sulfuric acid content of at least 98%, is added to stream 23 in order to compensate for the diluted strength of stream 23 due to water vapor absorption. The resulting combined sulfuric acid stream 25 is of increased sulfuric acid concentration compared to stream 23, and is suitable for further gas scrubbing in unit 20, after cooling to compensate for heat generation due to acid dilution. Stream 25 is passed through cooling coils 26, which are cooled by cooling water stream 27 or other suitable cooling medium which is sprayed or circulated external to coils 26. The cooling of the acid in coils 26 may also be accomplished by the circulation of ambient air external to coils 26, in which case the coils 26 will preferably be provided with external fins. The resultant cooled sulfuric acid stream 28 discharged from coils 26 is now divided into stream 22, which is recycled as described supra, and stream 29 which is processed in tower 30 in accordance with the present invention as will be described infra.

Returning to tower 20, the scrubbed process gas stream 31 discharged from the upper section of the unit 20 now contains sulfur dioxide in a concentration of about 6% to 12% by volume, together with excess free oxygen and inerts. Stream 31 is substantially free of water vapor, and is now of suitable composition for catalytic conversion of sulfur dioxide to sulfur trioxide, however stream 31 is at a relatively low temperature and must be heated to a suitable temperature generally in the range of 400° C. to 500° C. at which the catalytic conversion reaction takes place with optimum efficiency. Stream 31 is passed through the tubes 32 of gas-to-gas preheater 33, and is heated to a suitable temperature for catalytic conversion, generally in the range of 400° C. to 500° C., by heat exchange with hot converted gas. In some instances, the temperature level and heat content of the hot converted gas are not sufficient to provide the required temperature level in the heated gas stream 34 discharged from unit 33. In this case, stream 34 will be further heated by suitable additional heat exchange, such as by heat exchange with hot hydrocarbon combustion gas as described in U.S. Patent No. 3,172,725.

Stream 34 now passes into multi-stage catalytic converter 35, which is typically provided with four catalyst beds 36, 37, 38 and 393 in series. The catalyst beds generally consist of any suitable catalytic agent known to the art for the catalytic oxidation of sulfur dioxide to sulfur trioxide. In most instances, the catalyst bed will generally comprise either vanadium, vanadium oxide or platinum as the active catalytic agent, in the form of discrete particles which may be employed either in the pure state or else deposited on a suitable carrier such as kaolin or alumina. Stream 34 passes initially through catalyst bed 36, and exothermic catalytic oxidation of a portion of the sulfur dioxide content of stream 34 to sulfur trioxide takes place. Due to the resultant temperature rise, the process gas stream must be cooled to optimum catalysis temperature prior to further catalytic reaction. The hot partially converted process gas discharged from bed 36 is therefore removed from unit 35 above partition 40 as stream 41, which passes through heat exchanger 42 and is cooled to a suitable temperature for further catalytic conversion. Unit 42 will usually consist of a steam boiler, with condensate water being admitted via stream 43 and generated steam being removed via stream 44. The resultant cooled process gas stream 45 discharged from unit 42 and now at a temperature in the range of 400° C. to 500° C., is returned to unit 35 below partition 40 and above catalyst bed 37. The process gas stream flows downwards through bed 37, and further catalytic conversion of sulfur dioxide to sulfur trioxide takes place, with concomitant temperature rise due to the exothermic nature of the catalytic reaction. The process gas stream discharged below bed 37 must be cooled prior to further catalytic reaction in the succeeding catalyst bed 38. The cooling of the process gas is accomplished according to the present invention by the injection of a relatively cold process gas stream 46 into the main process gas stream within unit 35 and between beds 37 and 38.

Stream 46 principally contains oxygen, nitrogen and sulfur dioxide, and is substantially free of water vapor. The process gas stream 46 is derived from the processing sequence of the present invention which takes place in tower 30. Referring now to unit 30, the liquid sulfuric acid stream 29 containing dissolved sulfur dioxide is sprayed or otherwise dispersed into unit 30 above gas-liquid contact section 47, which consists of a conventional means for gas-liquid contact such as a packed section. Section 47 may be similar in configuration to section 21 described supra. A process air stream 48 is passed via blower 49 and stream 50 into unit 30 below section 47, and flows upwards countercurrent to the downflowing liquid sulfuric acid stream. Two important process results are attained in section 47. The sulfur dioxide originally in stream 29 is stripped from the liquid phase into the rising gas phase, and in addition the water vapor content of stream 50 is concomitantly absorbed from the rising gas phase into the liquid phase. The liquid sulfuric acid collected in the bottom of unit 30 is now substantially free of sulfur dioxide, and is removed from unit 30 via stream 51, which is divided into product sulfuric acid stream 52 and recycle acid stream 53. In some instances, all of stream 51 may be passed to product utilization via stream 52, in which case stream 53 would be omitted. In other cases, depending on process water balance considerations, all of stream 51 may be recycled to the process via stream 53, and stream 52 would be omitted. Returning to tower 30, the rising gas phase is removed from the upper part of unit 30 via process gas stream 54, which usually contains in the range of 0.1% to 2.0% sulfur dioxide content together with free oxygen and inerts such as nitrogen, and is substantially free of water vapor. Stream 54 is preferably produced at a temperature in the range of 30° C. to 130° C., and is passed to unit 35 and usefully employed as an interstage or interbed quench medium in accordance with the present invention. Stream 54 is divided into streams 46 and 55. Stream 46 is passed into unit 35 between catalyst beds 37 and 38 as described supra, and is injected and dispersed into the hot main process gas stream so as to provide a quench-cooling effect. The resulting cooled process gas stream next flows downwards through catalyst bed 38, and further catalytic conversion of sulfur dioxide to sulfur trioxide takes place. The resulting hot main process gas stream below bed 38 is quench-cooled by the injection of process gas stream 55, which is passed into unit 35 between beds 38 and 39. The total combined process gas stream, now at a temperature generally in the range of 400° C. to 500° C., flows downwards through the final catalyst bed 39 for final catalytic conversion of sulfur dioxide content to sulfur trioxide. It will be evident that the sulfur dioxide content of stream 54 is concomitantly converted to sulfur trioxide by the procedure of the present invention, due to the injection of streams 46 and 55 into unit 35 between catalyst beds, and thus the admission of stream 46 and 55 into unit 35 provides two highly useful results, namely a quench-cooling effect during catalytic conversion and the total recovery and conversion of sulfur dioxide in all of the process streams to sulfur trioxide.

The hot converted process gas stream 56 discharged from unit 35 below catalyst bed 39 now contains sulfur trioxide, a minor residual proportion of oxygen, and inerts such as nitrogen. Stream 56 is passed into heat exchanger 33 and flows external to tubes 32. The incoming process gas stream 31 is thus heated as described supra, while the converted gas stream 56 is cooled. The resulting cooled converted gas stream 57 discharged from unit 33 may be further cooled by means not shown, such as in an economizer or by heat exchange with cooling water, prior to absorption of sulfur trioxide, in order to moderate the temperature levels during absorption, since the subsequent sulfur trioxide absorption reaction is exothermic and serves to raise process stream temperatures.

Stream 57 next passes into the lower part of absorption tower 58 and below gas liquid contact section 59, which is any suitable means for attaining thorough gas-liquid contact such as a bed of packing or other suitable contact means. Section 59 may be similar in configuration to section 21 described supra. The converted and cooled process gas stream containing sulfur trioxide flows upwards through section 59, countercurrent to a down-flowing liquid phase admitted into unit 58 above section 59 via stream 60 and consisting of concentrated sulfuric acid of at least 98% sulfuric acid content by weight. Substantially complete absorption of sulfur trioxide into the liquid phase takes place in section 59, with the concomitant in situ formation of further sulfuric acid in the liquid phase. The residual tail gas stream 61 discharged from unit 58 above section 59 is now substantially free of sulfur oxides, and may be safely discharged to the atmosphere through a stack, not shown. In instances when the process is carried out at relatively high pressure, such as pressures of 7 kg./sq. cm. or higher, the tail gas stream 61 may be expanded through mechanical power recovery means such as a gas turbine before discharge to the atmosphere, in order to recover usable power.

The highly concentrated liquid sulfuric acid collected in the bottom of unit 58 now contains in excess of 98% sulfuric acid content by weight, due to sulfur trioxide absorption, and is at an elevated temperature. Concentrated sulfuric acid stream 62 is removed from the bottom of unit 58, and is preferably divided into streams 24, 63 and 64. Stream 24 is recycled as described supra, and stream 63 is passed to product utilization. Stream 64 is recycled to unit 58 for further gas scrubbing and sulfur trioxide absorption. Stream 64 must be diluted somewhat to a lower acid content of at least 98%, prior to recycle to unit 58, to compensate for sulfur trioxide absorption in unit 58. In addition, stream 64 must be cooled to compensate for heat liberation which occurs in unit 58. Dilution water stream 65 and recycle diluted sulfuric acid stream 53 are added to stream 64, to form combined recycle sulfuric acid stream 66, which contains at least 98% sulfuric acid content by weight. Stream 66 is cooled in cooling coils 67, which are usually similar in configuration and function to coils 26 described supra. Cooling water stream 68 is circulated external to coils 67. The resulting cooled sulfuric acid stream 60 discharged from coils 67 is sprayed or otherwise injected into tower 58 above section 59.

Referring now to FIGURE 2, an alternative and preferred embodiment of the invention is presented. In the process sequence shown in FIGURE 2, additional process air is added to the main sulfur dioxide-containing process stream after mist elimination, and elemental sulfur is burned in this process stream after water vapor removal, to increase sulfur dioxide concentration in the gas stream. In addition, as will appear infra, gas-to-gas heat exchanger 33 of FIGURE 1 is not required in the process sequence of FIGURE 2. Finally, process gas circulation in FIG. 2 is attained by the provision of a main circulating blower for the sulfur dioxide-containing process gas stream after water vapor removal. In other respects, the process arrangement of FIGURE 2 closely resembles the FIGURE 1 flowsheet, and consequently the corresponding process streams and apparatus units of FIGURE 2 have been provided with the same numerals as in FIGURE 1, and the process description supra relative to these process elements in FIGURE 1 applies equally to FIGURE 2, and therefore a summary description of these corresponding process and apparatus elements and their functions will be provided relative to the discussion infra of the process sequence of FIGURE 2.

Referring to FIGURE 2, sulfur-containing feed stream 1 is burned with combustion air stream 5 in furnace 2, to produce hot process gas stream 6 containing sulfur dioxide. Stream 6 is scrubbed with water stream 8 in tower 7 to remove entrained solid particles. The resulting process gas stream 16 is passed through mist elimination unit 17 to remove acid mist and entrained liquid droplets, which are recycled to the scrubbing water circuit via 13. The resulting process gas stream 19 discharged from unit 17 is now diluted with added process air stream 69, in order to provide additional free oxygen in the process gas stream. The resulting combined process gas stream 70 is scrubbed in tower 20 with concentrated sulfuric acid stream 22 to remove water vapor. The diluted sulfuric acid stream 23 withdrawn from unit 20 is recirculated after reconcentration by addition of sulfuric acid stream 24 and cooling in coils 26. Side stream 29 is removed and processed in unit 30 in accordance with the present invention by stripping with air stream 50 to produce sulfur dioxide-containing process gas stream 54, which is substantially free of water vapor and is employed as an interstage quench medium between stages of catalytic conversion in unit 35.

Returning to unit 20, process gas stream 31, now free of water vapor and containing sulfur dioxide and a relatively large proportion of excess free oxygen, is passed through main gas circulation blower 71. The pressurized process gas stream 72 discharged from unit 71 is passed to sulfur combustion furnace 73, together with elemental sulfur stream 74, which is oxidized to sulfur dioxide by high temperature reaction with a portion of the oxygen content of stream 72 in furnace 73. The resulting hot process gas stream 75 discharged from furnace 73 is now cooled to optimum temperature for subsequent catalytic conversion of sulfur dioxide to sulfur trioxide, by passing through heat exchanger 76 which is usually a waste heat steam boiler. Boiler feed water stream 77 is passed into unit 76 and generated steam is removed via stream 78. The resulting cooled process gas stream 34 discharged from unit 76, now typically at a temperature in the range of 400° C. to 500° C. is passed to multi-stage catalytic converter 35 for catalytic oxidation of sulfur dioxide to sulfur trioxide. Interbed or interstage cooling of the main process gas stream between beds 37 and 38 is attained by the injection of cold process gas stream 46 into the main process gas stream in unit 35, in accordance with the present invention. Similarly, interbed cooling of the main process gas stream between beds 38 and 39 is attained by the injection of cold process gas stream 55 into the main process gas stream in unit 35, in accordance with the present invention.

The resulting hot converted process gas stream 56 discharged from the bottom section of unit 35 is passed through heat exchanger 79, for heat recovery and gas cooling to optimum temperatures for subsequent sulfur trioxide absorption. Unit 79 may be a waste heat steam boiler, similar in configuration and function to unit 76 described supra, in which case stream 80 will consist of boiler feed water and stream 81 will consist of steam. In other instances, unit 79 may consist of a boiler feed water preheater or economizer. The resulting cooled process gas stream 57 discharged from unit 79 is passed to absorption tower 58, for recovery of sulfur trioxide in a liquid phase as sulfuric acid by contact with concentrated sulfuric acid stream 60, which is of at least 98% sulfuric acid content by weight. Product concentrated sulfuric acid is passed to market or product utilization via stream 63, while the tail gas stream 61 discharged from unit 58, now substantially free of sulfur oxides, is passed to the atmosphere.

Numerous alternatives within the scope of the present invention, besides those mentioned supra, will occur to those skilled in the art. The ranges of process variables such as temperature and process stream concentrations mentioned supra constitute preferred embodiments of the present invention for optimum utilization of the process concepts of the invention, and the invention may be practiced outside of these ranges in suitable instances.

In instances when stream 1 consists of a sulfur-containing feed stream such as hydrogen sulfide, which does not yield an entrained solids component in stream 6, the function of unit 7 will be merely to provide gas cooling, and in some instances units 7 and 17 may be omitted, particularly when stream 6 does not contain entrained solid particles and is subjected to initial cooling in a waste heat recovery facility such as a steam boiler, as described supra. In this case, the cooled stream 6 would pass directly to unit 20, usually after the addition of auxiliary air as described supra with regard to FIGURE 2. In some instances, water balance considerations may be such as to permit the elimination of unit 17. In such cases, when unit 7 is provided, the mist-laden process gas stream would pass directly into unit 20, and entrained aqueous mist would be removed from the gas stream in section 21 and form a component of stream 23. Section 9 of unit 7, section 21 of unit 20, section 47 of unit 30, or section 59 of unit 58 may be replaced by other appropriate types of gas-liquid contact means in suitable instances, and in some cases units 7, 20, 30 or 58 may merely consist of open spray towers. Stream 29 may be derived from stream 23 instead of stream 28 in some instances. Stream 24 may be added to stream 22 instead of stream 23 in some cases. In suitable instances, all of stream 28 may be passed via stream 29 to unit 30, in which case stream 22 would be derived as a portion of stream 51.

Unit 35 is essentially a multi-stage catalytic converter provided with a plurality of separate catalyst beds, and consequently more or less than four beds may be provided in practice, although a four bed unit provides optimum results. In most instances, the cooling of the hot process gas stream discharged from the initial bed 36 will take place by means of external heat exchange in steam boiler 42, however, it will be understood that the cooling of this hot process gas stream below bed 36 may alternatively be accomplished in suitable instances by the provision of internal cooling coils within unit 35 and below bed 36, or by the injection of a portion of stream 54 between beds 36 and 37. In addition, in some instances streams 46 or 55 may be omitted, with all of stream 54 being injected as a single stream between two adjacent catalyst beds and the requisite cooling of the process gas stream between the other catalyst beds being accomplished by the provision of internal cooling coils. In cases where a three bed converter is provided, the entire stream 54 will usually be injected between the middle and lowest or final catalyst bed. The flow of process gas through unit 35 may alternatively be vertically upwards from a lower inlet to an upper outlet. The catalyst beds 36, 37, 38 or 39 may be disposed in separate converter vessels, with injection of quench streams such as 46 and 55 into the main process gas stream between vessels.

Stream 57 may be initially scrubbed with a liquid stream consisting of oleum in a separate oleum tower, prior to passing to unit 58. In this case, a portion of the sulfur trioxide content of stream 57 would be absorbed in the oleum, which would serve to produce a concentrated oleum product. The residual process gas stream of diminished sulfur trioxide content discharged from the oleum tower would then pass to unit 58 for final absorption of residual sulfur trioxide and production of product sulfuric acid. Depending on water balance considerations, in some instances stream 65 may be omitted, with all of the requisite dilution water being provided by the addition of sulfuric acid stream 53, which contains excess water, to stream 64 to form stream 66. Finally, in cases where stream 74 of FIGURE 2 is of small magnitude relative to the sulfur content of stream 1, unit 76 and its function may be omitted.

An example of an industrial application of the process of the present invention will now be described.

EXAMPLE

The process sequence of the present invention as described supra with respect to FIGURE 2 was applied to a commercial facility burning sludge acid and sulfur, and having a rated capacity of 1360 metric tons per day of equivalent 100% sulfuric acid. The facility was designed to produce 93% sulfuric acid, 98% sulfuric acid and oleum at varying output rates, depending on market requirements.

Following are data tables of flow rate, composition and temperatures of principal process streams. The ambient air employed in the process had an assumed average dew point of 20° C.

TABLE I

| Stream No. | Flow Rate Cubic Meters per minute | Composition of Stream, Volume Percent | | | | |
|---|---|---|---|---|---|---|
| | | Oxygen | Sulfur Dioxide | Sulfur Trioxide | Water Vapor | Inerts |
| 5 | + 348 | 20.8 | | | 0.99 | 78.2 |
| 6 | 505 | 3.0 | 8.9 | | 24.0 | 64.1 |
| 69 | 1,782 | 20.8 | | | 0.99 | 78.2 |
| 48 | 631 | 20.8 | | | 0.99 | 78.2 |
| 29 | 1.89 | | 0.1 | | | |
| 51 | 1.91 | | 0.005 | | | |
| 54 | 631 | 20.8 | 0.18 | | | 79.0 |
| 46 | 422 | 20.8 | 0.18 | | | 79.0 |
| 55 | 209 | 20.8 | 0.18 | | | 79.0 |
| 31 | 2,170 | 19.0 | 2.0 | | | 79.0 |
| 34 | 2,170 | 10.6 | 10.4 | | | 79.0 |
| 41 | 2,070 | 7.1 | 2.7 | 8.1 | | 82.1 |
| 56 | 2,680 | 9.5 | 0.2 | 8.2 | | 82.1 |
| 61 | 2,460 | 10.51 | 0.19 | | | 89.3 |

In addition, 22.3 cubic meters per minute of natural gas was passed into unit 2, to aid in the combustion of the sludge acid.

Following are the flow rates of additional feed and process streams.

TABLE II

| Stream No. | Flow Rate, kg./min. | Nominal Composition |
|---|---|---|
| 1 | 189.0 | Sludge Acid. |
| 74 | 260.0 | Sulfur. |
| 29 | 3,460 | 93% Sulfuric Acid. |
| 51 | 3,490 | Do. |

Following are the temperatures of selected process streams.

Table III

| Stream No.: | Temp., ° C. |
|---|---|
| 75 | 1090 |
| 34 | 440 |
| 41 | 620 |
| 45 | 440 |
| 54 | 65 |
| 56 | 440 |
| 57 | 230 |

Finally, stream 31 was at a pressure of 0.914 kg./sq. cm., and stream 72 was at a pressure of 1.408 kg./sq. cm.

We claim:

1. In the process for sulfuric acid production in which a sulfur-containing feed stream is burned with a first air stream, whereby a first process gas stream containing sulfur dioxide, excess free oxygen and water vapor is produced, said first process gas stream is scrubbed with a first stream of concentrated sulfuric acid to absorb water vapor, whereby the resulting first sulfuric acid stream contains dissolved sulfur dioxide and a substantially anhydrous first process gas stream containing sulfur dioxide and free oxygen is produced, said first process gas stream is passed through a plurality of catalyst bed stages in series, with interstage cooling of said first gas stream between beds, whereby sulfur dioxide in said first gas stream is catalytically converted to sulfur trioxide, and said first gas stream is scrubbed with a second stream of concentrated sulfuric acid to produce further sulfuric acid in solution, the improvement which comprises:

(a) stripping sulfur dioxide from at least a portion of said resulting first sulfuric acid stream containing dissolved sulfur dioxide, by passing a second air stream in contact with said first sulfuric acid portion, whereby a substantially anhydrous second process gas stream containing sulfur dioxide and free oxygen, and a sulfuric acid stream free of sulfur dioxide are produced, and (b) adding the second process gas stream produced by step (a) and containing sulfur dioxide and free oxygen to said first process gas stream during catalytic conversion of sulfur dioxide to sulfur trioxide and between at least two catalyst bed stages, whereby said second process gas stream quench-cools said first process gas stream between beds to provide interstage cooling and the sulfur dioxide content of said second process gas stream is catalytically converted to sulfur trioxide.

2. The process of claim 1, in which said sulfur-containing feed stream is selected from the group consisting of hydrogen sulfide, sludge acid and pyrites.

3. The process of claim 1, in which said first stream of concentrated sulfuric acid contains in the range of 90% to 100% sulfuric acid content, and said second stream of concentrated sulfuric acid contains at least 98% sulfuric acid content.

4. The process of claim 1, in which said second process gas stream containing sulfur dioxide and free oxygen, and produced by step (a), is produced at a temperature in the range of 30° C. to 130° C. and contains in the range of 0.1% to 2.0% sulfur dioxide content.

5. The process of claim 1, in which a third air stream is added to said first process gas stream containing sulfur dioxide, excess free oxygen and water vapor, prior to the scrubbing of said first gas stream with said first stream of concentrated sulfuric acid.

6. The process of claim 1, in which the burning of said sulfur-containing feed stream with air produces a first process gas stream which also contains entrained solid particles, and said first process gas stream is scrubbed with an aqueous solution to remove entrained solid particles, prior to the scrubbing of said first gas stream with said first stream of concentrated sulfuric acid.

7. In the process for sulfuric acid production in which a sulfur-containing feed stream is burned with a first air stream to produce a first process gas stream containing sulfur dioxide, excess free oxygen, and entrained solid particles, said first gas stream is scrubbed with an aqueous solution to remove entrained solid particles, whereby the resulting first gas stream is substantially saturated with water vapor, said first gas stream is scrubbed with a first stream of concentrated sulfuric acid to absorb water vapor, whereby the resulting first sulfuric acid stream contains dissolved sulfur dioxide and a substantially anhydrous first process gas stream containing sulfur dioxide and free oxygen is produced, said first process gas stream is passed through a plurality of catalyst bed stages in series, with interstage cooling of said first process gas stream between beds, whereby sulfur dioxide in said first process gas stream is catalytically converted to sulfur trioxide, and said first process gas stream is scrubbed with a second stream of concentrated sulfuric acid to produce further sulfuric acid in solution, the improvement which comprises:

(a) stripping sulfur dioxide from at least a portion of said resulting first sulfuric acid stream containing dissolved sulfur dioxide, by passing a second air stream in contact with said first sulfuric acid portion, whereby a substantially anhydrous second process gas stream containing sulfur dioxide and free oxygen, and a sulfuric acid stream free of sulfur dioxide are produced, and (b) adding the second process gas stream produced by step (a) and containing sulfur dioxide and free oxygen to said first process gas stream during catalytic conversion of sulfur dioxide to sulfur trioxide and between at least two catalyst bed stages, whereby said second process gas stream quench-cools said first process gas stream between beds to provide interstage cooling and the sulfur dioxide content of said second process gas stream is catalytically converted to sulfur trioxide.

8. The process of claim 7, in which said sulfur-containing feed stream is selected from the group consisting of sludge acid and pyrites.

9. The process of claim 7, in which said first stream of concentrated sulfuric acid contains in the range of 90% to 100% sulfuric acid content, and said second stream of concentrated sulfuric acid contains at least 98% sulfuric acid content.

10. The process of claim 7, in which said substantially anhydrous second process gas stream containing sulfur dioxide, and produced by step (a), is produced at a temperature in the range of 30° C. to 130° C. and contains in the range of 0.1% to 2.0% sulfur dioxide content.

11. The process of claim 7, in which the number of catalyst bed stages is four, and said second process gas stream produced by step (a) and containing sulfur dioxide is added to said first process gas stream by dividing said second process gas stream into a first portion and a second portion, adding the first portion of said process gas stream to said first process gas stream between the second and third catalyst bed stages, and adding the second portion of said second process gas streams to said first process gas stream between the third and fourth catalyst bed stages.

12. The process of claim 7, in which a third air stream is added to said scrubbed first process gas stream substantially saturated with water vapor, prior to the scrubbing of said first process gas stream with said first stream of concentrated sulfuric acid.

13. In the process for sulfuric acid producition in which a sulfur-containing feed stream is burned with a first air stream to produce a first process gas stream containing sulfur dioxide and entrained solid particles, said first gas stream is scrubbed with an aqueous solution to remove entrained solid particles, whereby the resulting first process gas stream is substantially saturated with water vapor, a second air stream is added to said first process gas stream, the combined first process gas stream is scrubbed with a first stream of concentrated sulfuric acid to absorb water vapor, whereby the resulting first sulfuric acid stream contains dissolved sulfur dioxide and a substantially anhydrous first process gas stream containing sulfur dioxide and free oxygen is produced, sulfur is burned with said first process gas stream to provide further sulfur dioxide content in said first process gas stream, said first process gas stream is passed through a plurality of catalyst bed stages in series, with interstage cooling of said first process gas stream between beds, whereby sulfur dioxide in said first process gas stream is catalytically converted to sulfur trioxide, and said first process gas stream is scrubbed with a second stream of concentrated sulfuric acid to produce further sulfuric acid in solution, the improvement which comprises:

(a) stripping sulfur dioxide from at least a portion of said resulting first sulfuric acid stream containing dissolved sulfur dioxide, by passing a third air stream in contact with said first sulfuric acid portion, whereby a substantially anhydrous second process gas stream containing sulfur dioxide and free oxygen, and a sulfuric acid stream free of sulfur dioxide are produced, and (b) adding the second process gas stream produced by step (a) and containing sulfur dioxide and free oxygen to said first process gas stream during catalytic conversion of sulfur dioxide to sulfur trioxide and between at least two catalyst bed stages, whereby said second process gas stream quench-cools said first process gas stream between beds to provide interstage cooling and the sulfur dioxide content of said second process gas stream is catalytically converted to sulfur trioxide.

14. The process of claim 13, in which said first stream of concentrated sulfuric acid contains in the range of 90% to 100% sulfuric acid content, and said second stream of concentrated sulfuric acid contains at least 98% sulfuric acid content.

15. The process of claim 13, in which said second process gas stream containing sulfur dioxide and free oxygen, and produced by step (a), is produced at a temperature in the range of 30° C. to 130° C. and contains in the range of 0.1% to 2.0% sulfur dioxide content.

16. The process of claim 13, in which said sulfur-containing feed stream is selected from the group consisting of sludge acid and pyrites.

17. The process of claim 13, in which the number of catalyst bed stages is four, and said second process gas stream produced by step (a) and containing sulfur dioxide and free oxygen is added to said first process gas stream by dividing said second process gas stream into a first portion and a second portion, adding the first portion of said second process gas stream to said first process gas stream between the second and third catalyst bed stages, and adding the second portion of said second process gas stream to said first process gas stream between the third and fourth catalyst bed stages.

References Cited

UNITED STATES PATENTS

| 2,066,774 | 1/1937 | Fowler et al. | 23—175 |
| 2,136,298 | 11/1938 | Harrison et al. | 23—175 |
| 2,180,727 | 11/1939 | Carter | 23—175 |

OSCAR R. VERTIZ, Primary Examiner

S. B. SHEAR, Assistant Examiner

U.S. Cl. X.R.

23—175